(12) United States Patent
Phillips et al.

(10) Patent No.: US 7,037,040 B2
(45) Date of Patent: May 2, 2006

(54) METHOD FOR THE PLACEMENT OF SUBTERRANEAN ELECTRODES

(75) Inventors: Steven J. Phillips, Sunnyside, WA (US); Robert G. Alexander, Kennewick, WA (US)

(73) Assignee: Applied Geotechnical Engineering and Construction, Inc. (Agec, Inc.), Richland, WA (US)

( * ) Notice: Subject to any disclaimer, the term of this patent is extended or adjusted under 35 U.S.C. 154(b) by 206 days.

(21) Appl. No.: 10/771,226

(22) Filed: Feb. 2, 2004

(65) Prior Publication Data

US 2005/0167099 A1 Aug. 4, 2005

(51) Int. Cl.
*B09B 3/00* (2006.01)

(52) U.S. Cl. ............... 405/129.6; 175/171; 37/348

(58) Field of Classification Search ............ 175/22, 175/45, 84, 171; 405/252.1, 253, 303, 129.45, 405/129.6; 37/348
See application file for complete search history.

(56) References Cited

U.S. PATENT DOCUMENTS

| | | | | |
|---|---|---|---|---|
| 3,475,781 A * | 11/1969 | Grant | ............ | 175/84 |
| 3,688,014 A * | 8/1972 | Versteeg | ............ | 175/22 |
| 3,833,071 A * | 9/1974 | Koosman et al. | ............ | 175/171 |
| 4,034,490 A * | 7/1977 | Teach | ............ | 37/348 |
| 4,376,598 A | 3/1983 | Brouns et al. | | |
| 4,762,991 A | 8/1988 | Timmerman et al. | | |
| 5,100,259 A | 3/1992 | Buelt et al. | | |
| 5,114,277 A | 5/1992 | Murphy et al. | | |
| 5,114,497 A | 5/1992 | Johnson et al. | | |
| 5,190,628 A | 3/1993 | Bibler | | |
| 5,316,411 A | 5/1994 | Buelt et al. | | |
| 5,420,402 A | 5/1995 | Bridges et al. | | |
| 5,482,402 A | 1/1996 | Nelson | | |
| 5,484,233 A | 1/1996 | Kunito | | |
| 5,494,376 A | 2/1996 | Farrar et al. | | |
| 5,497,567 A | 3/1996 | Gilbert | | |
| 5,503,501 A | 4/1996 | Kunito | | |
| 5,621,845 A | 4/1997 | Bridges et al. | | |
| 5,631,160 A | 5/1997 | Bruso | | |
| 5,645,376 A | 7/1997 | Taki | | |
| RE35,715 E | 1/1998 | Circeo, Jr. et al. | | |
| 5,830,752 A | 11/1998 | Bruso | | |
| 5,890,840 A | 4/1999 | Carter, Jr. | | |
| 5,905,184 A | 5/1999 | Carter, Jr. | | |
| 5,910,093 A | 6/1999 | Sliger | | |
| 5,931,605 A | 8/1999 | Toor et al. | | |
| 5,934,387 A * | 8/1999 | Tuunanen | ............ | 175/45 |
| 5,980,446 A | 11/1999 | Loomis et al. | | |
| 6,120,430 A | 9/2000 | Hansen et al. | | |
| 6,190,526 B1 | 2/2001 | Ho | | |
| 6,193,443 B1 * | 2/2001 | Trudeau et al. | ............ | 405/303 |

* cited by examiner

*Primary Examiner*—David Bagnell
*Assistant Examiner*—Matthew J. Smith
(74) *Attorney, Agent, or Firm*—Wells St. John P.S.

(57) ABSTRACT

A method for the placement of subterranean electrodes is disclosed and which includes the steps of providing an earth engaging drill; forming a bore hole in the surface of the earth with the earth engaging drill; providing an electrode; and delivering the electrode into the bore hole by employing the earth engaging drill.

10 Claims, 8 Drawing Sheets

METHOD FOR THE PLACEMENT OF SUBTERRANEAN ELECTRODES

TECHNICAL FIELD

The present invention relates to a method for the placement of subterranean electrodes, and more specifically, to a method which provides for the relatively rapid and accurate placement of subterranean electrodes while simultaneously permitting the electrodes to be electrically coupled to the surrounding earthen soil.

BACKGROUND OF THE INVENTION

Subterranean electrodes are routinely placed in the surface of the earth for various physiochemical, electrical or acoustical applications. One common method for using such subterranean electrodes includes the creation of vitrified underground structures which contain or otherwise encase hazardous waste material. Heretofore, the method of isolating contaminated material at waste sites containing various types of waste was to make barriers, such as concrete retaining walls and plastic lined structures to enclose or otherwise contain the hazardous material. Such structures as a general matter do not have the durability and effectiveness of vitrified soil. Still further, the prior art techniques of providing such artificial barriers had attendant shortcomings such as the requirement to remove soil and waste materials before the creation of the structure. Such handling steps were expensive and often involved the possibility of hazardous waste exposure for the construction personnel or releasing hazardous materials or gases into the ambient environment.

Solidification of soil by in-situ melting and vitrification using heat generated in the soil itself between spaced electrodes has long been known and has been discussed in earlier prior art patents such as U.S. Pat. Nos. 4,376,598, and 5,114,277, the teachings of which are incorporated by reference herein. The prior art method of vitrification is shown in FIG. 1 in the drawings, and which shows a typical arrangement whereby a plurality of electrodes are placed in a position surrounding the region of soil which needs to be vitrified, and thereafter, an electrically conductive pathway is established between the electrodes and immediately below the surface of the ground. Thereafter, electricity is applied to the electrodes with the result that the soil and regions between the electrodes is heated to a temperature where vitrification takes place.

While the prior art practice of vitrification, noted above, has worked with a great deal of success, there are many shortcomings attendant with prior art practices and other devices utilized with same. For example, at some hazardous waste sites, the hazardous material is buried in long continuous trenches and the process of vitrification of the entire trench takes a considerable period of time. As seen in FIG. 1, a housing or outgasing hood is placed over the top of the area of soil being vitrified in order to entrap gases which are produced during the vitrification process. As should be appreciated, as the entire trench area is being processed, it becomes important to align the electrodes such that one region of vitrification may align with and be joined to an adjacent vitrified region such that hazardous material within the trench is completely enclosed. The proper alignment of these electrodes therefore becomes increasingly difficult when they are placed along extended trenches. In addition to the foregoing, the placement of the electrodes in the earth, and thereafter the electrical coupling of the electrodes to the subterranean soil has often been done with some degree of difficulty. For example, in the prior art practice, a bore hole was made in the surface of the earth, and often, before the electrode was placed in the bore hole, the sidewalls of the bore hole would collapse. This would, of course, lead to further excavation. Still further, it has often been difficult to make a good electrical connection between the electrode and the surrounding earthen soil. Moreover, the creation of an electrically conductive pathway between the electrodes often merely consisted of forming a shallow electrically conductive pathway in the surface of the earth as seen in FIG. 1.

Therefore, the present invention relates to a novel method for the placement of subterranean electrodes and electrode pathways which avoids the shortcomings attendant with the prior art practices.

SUMMARY OF THE INVENTION

Therefore, one aspect of the present invention is to provide a method for the placement of subterranean electrodes, and which includes providing an earth engaging drill; forming a bore hole in the surface of the earth with the earth engaging drill; providing an electrode; and delivering the electrode into the bore hole by employing the earth engaging drill.

Another aspect of the present invention relates to a method for the placement of subterranean electrodes, and which includes providing an earth engaging drill which has a first end, and an opposite second end, and which further defines a centrally disposed bore which extends between the first and second ends; providing an earth engaging drill bit which is releasably mounted on the second end of the earth engaging drill; drilling a bore hole in the earth by bringing the earth engaging drill bit into contact with the surface of the earth and rotating the earth engaging drill and drill bit in a first direction to form the bore hole in the earth; positioning a first electrode in the centrally disposed bore of the earth engaging drill; detaching the earth engaging drill bit from the second end of the earth engaging drill, before, or while simultaneously delivering the first electrode into the bore hole; and removing the earth engaging drill from the bore hole by rotating the earth engaging drill in a second direction.

Still another aspect of the present invention relates to a method for the placement of subterranean electrodes and formation of electrode pathways and which includes providing an overland vehicle for carrying and positioning an earth engaging drill into a drilling position relative to the surface of the earth, and further providing an electro-optical alignment assembly which is borne by the overland vehicle and which facilitates the positioning of the earth engaging drill assembly in a given orientation relative to the surface of the earth.

Yet a further aspect of the present invention relates to a method for the placement of subterranean electrodes and which further includes the steps of providing an electrically conductive slurry; and coupling the electrically conductive slurry in fluid flowing relation relative to the earth engaging drill; and electrically coupling the electrode to the surrounding earth by delivering the electrically conductive slurry to a bore hole by way of the earth engaging drill.

Still another aspect of the present invention relates to a method for the placement of subterranean electrodes comprising providing an earth engaging drill; providing an electrode which is releasably borne by the earth engaging drill; moving the earth engaging drill in a first direction to form a subterranean bore hole, and wherein the electrode moves in unison with the earth engaging drill as it moves in the first direction; moving the earth engaging drill in a second direction to remove the earth engaging drill from the subterranean bore hole, and wherein the electrode remains substantially stationary within the bore hole; providing an electrically conductive slurry and coupling the electrically conductive slurry in fluid flowing relation relative to the earth engaging drill; and delivering the electrically conductive slurry into the bore hole while simultaneously moving the earth engaging drill in the second direction.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
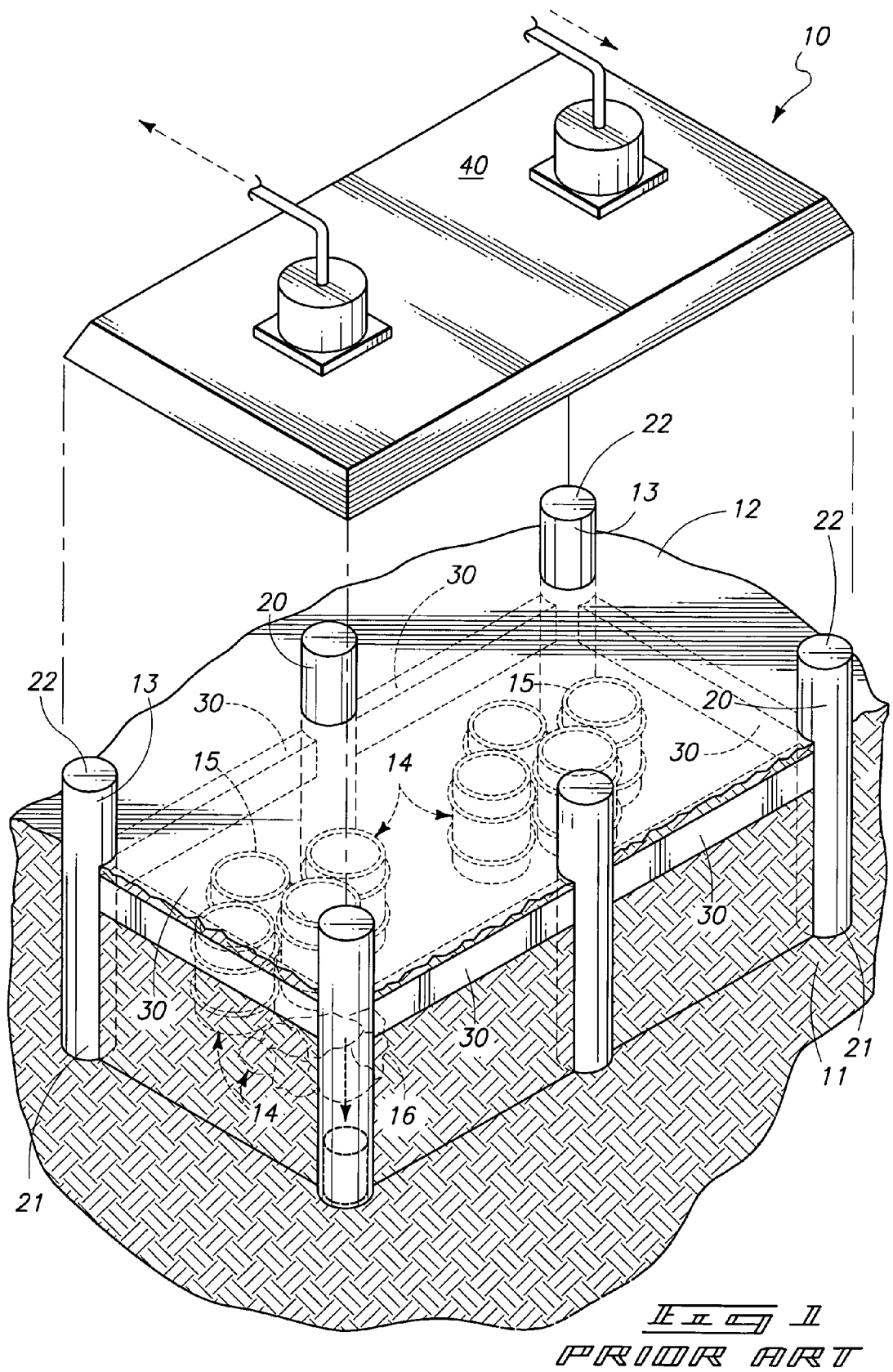
FIG. 1 is a greatly simplified exploded view of a prior art arrangement for the vitrification of earthen soil.

Referring now to FIG. 1, a prior art arrangement 10 for the vitrification of earthen soil 11 is shown in a greatly simplified exploded view. The surface of the earth 12 has formed therein a plurality of subterranean bore holes 13 using various methods and apparatus known in the art. The subterranean bore holes surround contaminated material generally indicated by the numeral 14. Such contaminated material might include drums 15 or non-enclosed material 16. Electrodes 20 are received in each of the individual bore holes. The electrodes have a first end 21, which is received in and is positioned below the surface of the earth 12, and a second end 22 which extends above the earth surface. A source of electrical power, not shown, is electrically coupled with the electrodes. As seen in FIG. 1, this prior art arrangement includes an electrically conductive pathway generally indicated by the numeral 30, and which electrically couples the respective electrodes in ohmic electrical contact one with the other. This conductive pathway is located close to the surface of the earth 12. In the prior art arrangement as seen in FIG. 1, an enclosure or outgassing hood 40 is positioned over the region of the earth 11 and positioned substantially between the respective electrodes 20. The outgassing hood 40 is operable to receive and capture any noxious or other undesirable fumes or gases which may be produced as a result of the vitrification of the region between the respective electrodes 20. As should be understood, as electricity is applied to the electrodes, the region between the electrodes is heated and the earthen soil is vitrified thereby forming a solid mass which completely encloses, and encases the contaminated material 14 therewithin. This, of course, prevents any escape or leakage of any of the contaminated material to the surrounding earthen soil or to ambient environment.

Figure 2:
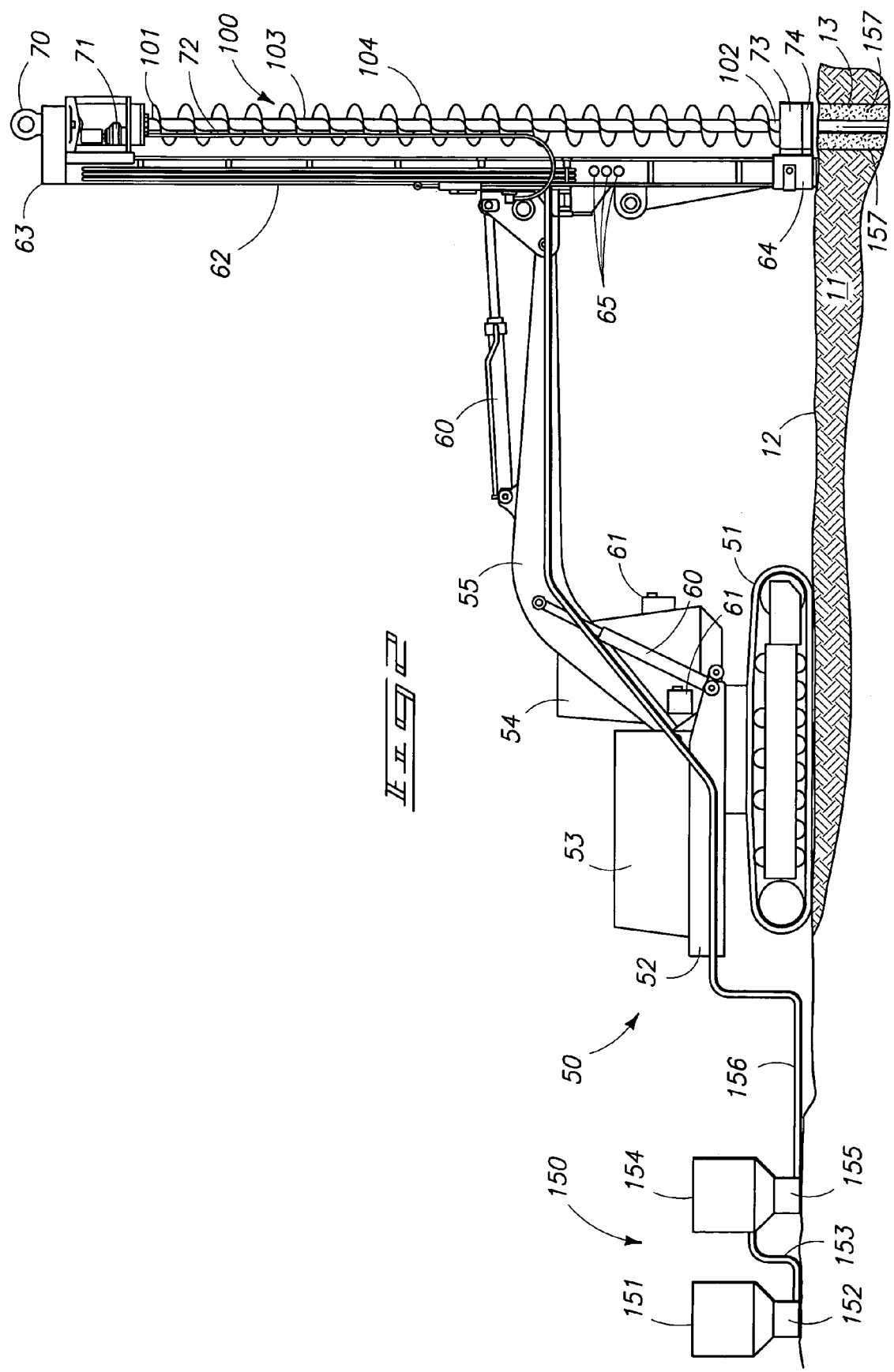
FIG. 2 is a greatly simplified depiction of an arrangement for practicing the method for the placement of subterranean electrodes.
Figure 6:
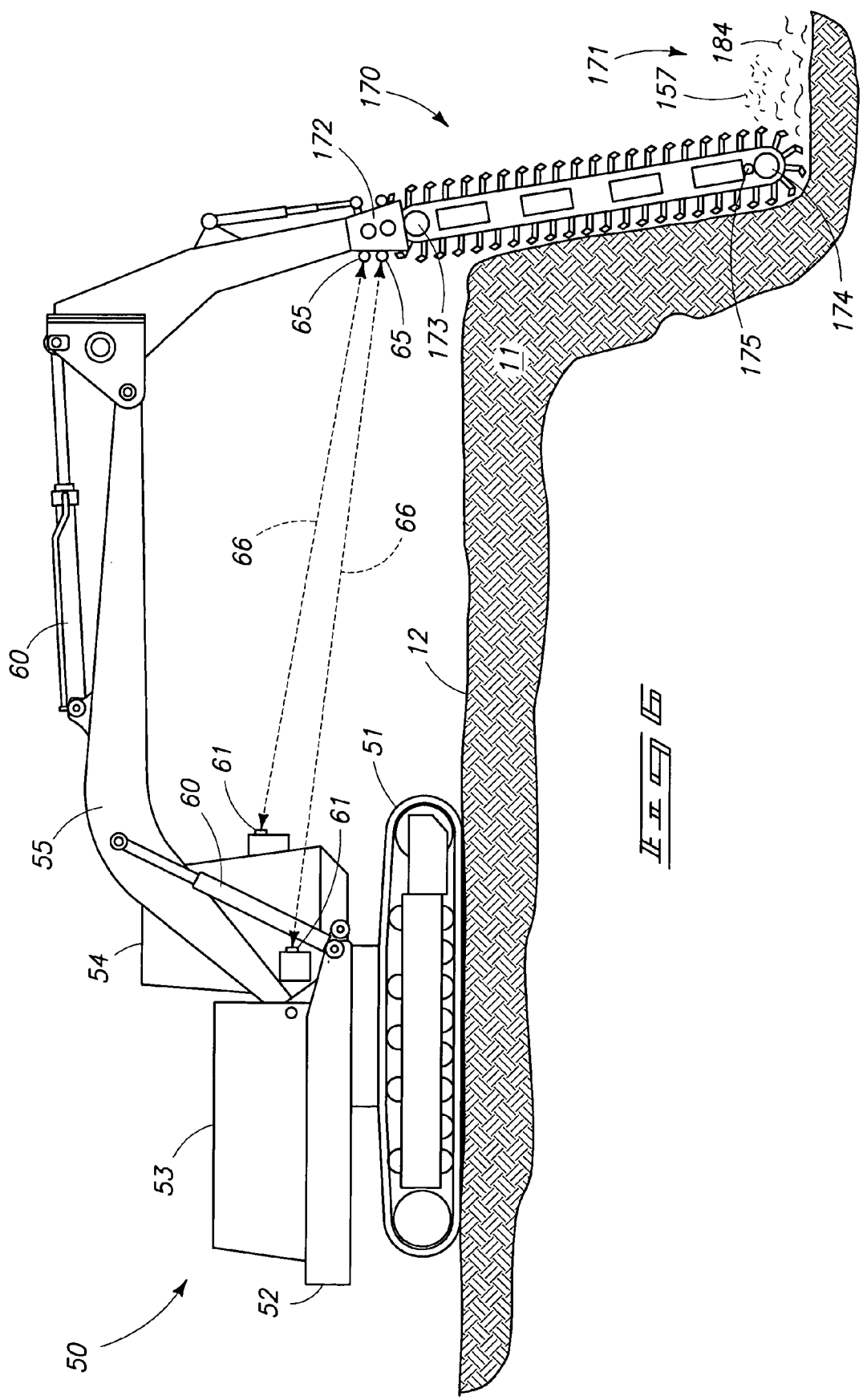
FIG. 6 is a greatly simplified depiction of yet another arrangement for practicing the method of the present invention.
Figure 9:
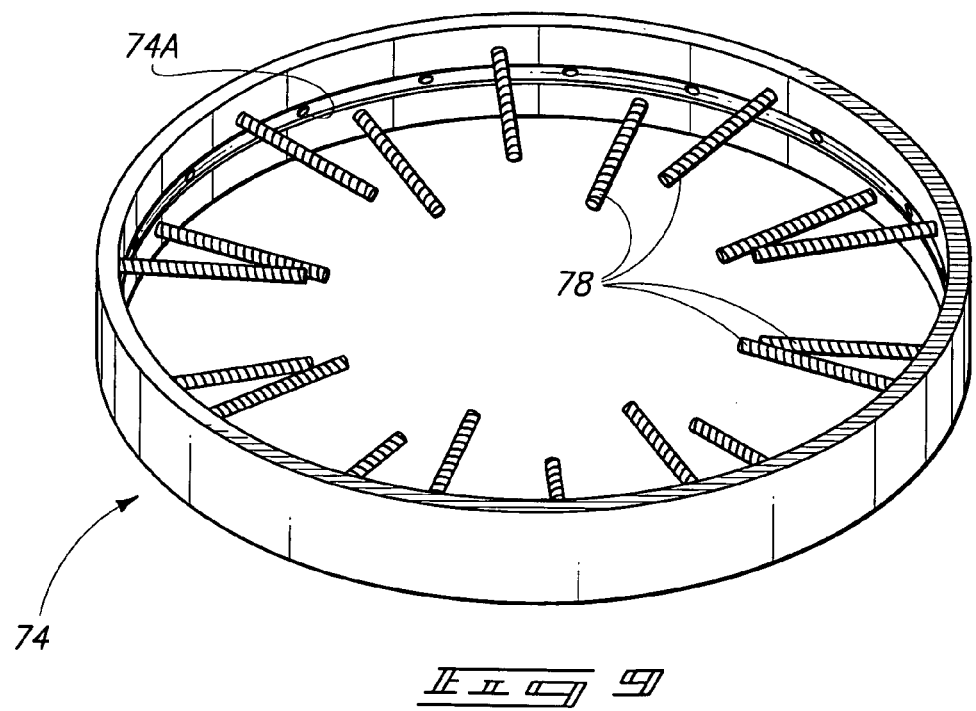
FIG. 9 is a fragmentary, perspective, side elevation view of one form of a spray ring which is employed in the practice of the present invention.

Referring now to FIG. 2, the method of the present invention includes a step of providing an overland vehicle which is generally indicated by the numeral 50 for carrying, and positioning an earth engaging drill, in a drilling position, relative to the surface of the earth 12. The earth engaging drill of the present invention will be discussed in greater detail hereinafter. The overland vehicle 50 is of conventional design, and has an earth engaging track 51 which rests in contact with the surface of the earth 12. Still further, a frame is mounted on, and positioned above the track. Further, a motor 53 is mounted on the frame 52 and is operable to power and propel the overland vehicle, and various subassemblies mounted thereon. The frame further supports an operator's control position, or cab 54. Still further, a moveable boom 55 is borne by the frame, and which can be located in various orientations relative to the surface of the earth 12 by means of several hydraulic cylinders and associated rams 60 which are powered by the motor 53. As seen in FIG. 2, a pair of electro-optical alignment assemblies, which are generally indicated by the numeral 61, are borne by the overland vehicle 50, and are individually operable to emit electromagnetic radiation 66 (FIG. 6) which, when reflected off of several targets, which will be described below, facilitate the appropriate positioning of the overland vehicle, and the drilling gantry 62, which is positioned endwardly of the boom 55, in an appropriate orientation relative to the surface of the earth 12. In the method of the present invention, the overland vehicle 50 is provided with a moveable drilling gantry 62. The drilling gantry has a first end 63 and an opposite second end 64. As seen in FIG. 2, electro-optical targets 65 are provided on the drilling gantry. These provide a means by which electromagnetic radiation 66 transmitted by the pair of electro-optical assemblies 61 may be reflected back toward same (FIG. 6). This arrangement provides a convenient means by which appropriate positioning of the drilling gantry can be ascertained by an operator operating the overland vehicle. It will be further recognized that a secondary fixed target (not shown) may be provided and which will provide a means for the overland vehicle to be directed along a predetermined path of travel across the surface of the earth. As seen in FIG. 2, the drilling gantry 62 is provided with a hydraulic winch 70. The hydraulic winch is operable to lower, or raise an electrode or other assembly which will be received internally of an earth engaging drill as will be discussed below. Mounted adjacent to, and near the first end 63 of the drilling gantry, is a hydraulic rotational motor which is generally indicated by the numeral 71. This motor 17 is operable, when energized, to rotate the earth engaging drill in a first direction, and then in a second direction as will be discussed in greater detail hereinafter. A hydraulic line 72 couples the hydraulic motor 71 in fluid flowing relation relative to a hydraulic pump which itself is powered by the motor 53 that is borne by the overland vehicle 50. The drilling gantry 62 is further provided with an alignment collar 73. The alignment collar is operable to locate and keep in a proper orientation relative to the drilling gantry 62, the earth engaging drill. The drilling gantry 62 is further provided with a spray ring which is generally indicated by the numeral 74, and is best seen in FIG. 9. The spray ring, which is located adjacent to the alignment collar 73, includes a plurality of apertures or orifices thereabout 74A, and which are operable to direct a source of fluid 75 (FIG. 4) to the closely adjacent earth engaging drill. As will be discussed in greater detail hereinafter, this stream of fluid, which is provided under pressure, is operable to remove earthen soil and/or other contaminated material which may be attached to the earth engaging drill after it is removed from the bore hole 13. The source of fluid 75, is coupled in fluid flowing relation relative to the spray ring by way of a conduit generally indicated by the numeral 76. A pump 77 is provided and which delivers the source of water under pressure to the spray collar 74. This arrangement is seen most clearly by reference to FIG. 4. Additionally, the spray ring may include a plurality of resilient scrapers/wipers 78 which are operable to engage the earth engaging drill 100 in order to loosen any earthen soil which is adhering thereto.

Figure 7:
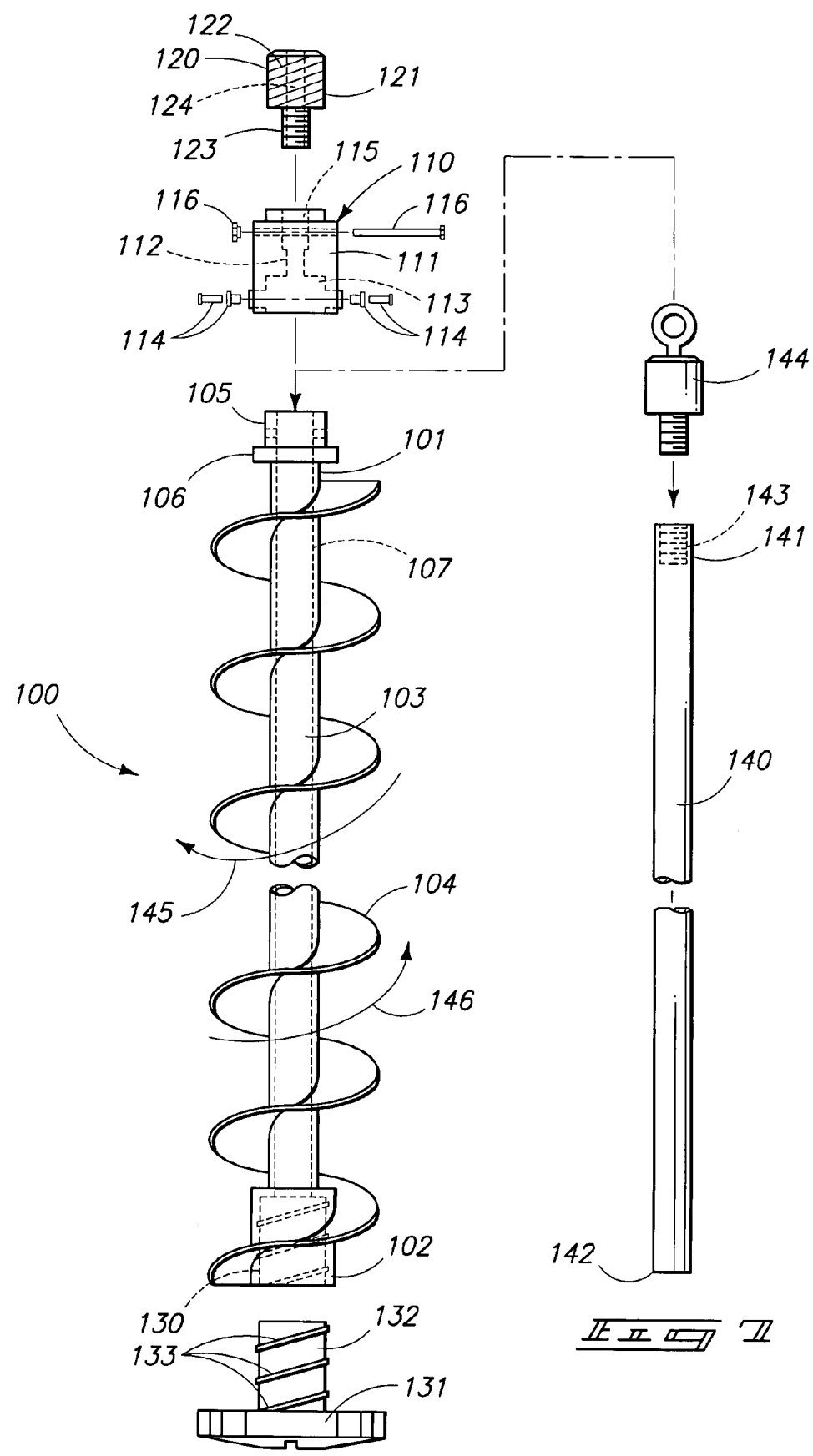
FIG. 7 is a fragmentary, exploded, side elevation view of an earth engaging drill, along with an associated electrode and which is useful for practicing the present invention.

As briefly discussed above, the present method for the placement of subterranean electrodes includes a step of providing an earth engaging drill 100; placing the earth engaging drill 100 into contact with the surface of the earth 12; and rotating the earth engaging drill by means of the hydraulic motor 71 in a first direction to form the bore hole 13. Referring now to FIG. 7, the earth engaging drill 100 has a first end 101 and an opposite second end 102. The earth engaging drill has a centrally disposed shaft portion 103, and further has a continuous flight or thread portion 104 which extends helically thereabout the shaft 103. As seen most clearly by reference to FIG. 7, the earth engaging drill 100 includes a male coupler 105 which is affixed to the first end 101. The male coupler includes a circumscribing flange portion 106. Still further, a longitudinally extending bore 107 extends between the first end 101, and the second end 102. The bore is operable to receive and support an appropriate electrode as will be described in greater detail hereinafter. The longitudinally extending bore 107 has a cross-sectional or inside diametral dimension which is greater than the diametral dimension of the associated electrode which is received therein.

Referring still to FIG. 7, the method of the present invention further includes a step of providing a drive head which is generally indicated by the numeral 110 and which couples the earth engaging drill 100 in force receiving relation relative to the hydraulic motor 71. The drive head 110 has a main body 111 which has a centrally disposed passageway 112 formed therein. The passageway 112 includes a first coupler receiver portion 113. A connector coupling and associated bushing generally indicated by the numeral 114 is received through the main body 111 and is operable to affix the drive head 110 thereon the male coupler 105. The main body 111 and more specifically, the passageway 112 further includes a slurry swivel receiver portion 115. The main body 111, which defines this slurry swivel receiver portion 115, has suitable screw threads formed therein. A drive head pin 116 is provided and which is received through the main body and is operable to affix a threaded slurry swivel adapter 120 therein.

As seen most clearly in the exploded view of FIG. 7, the slurry swivel adapter 120 includes a main body 121 which threadably mates with the drive head 110. The slurry swivel adapter further has a threaded exterior surface 122, and a threaded neck portion which is generally indicated by the numeral 123. A passageway 124 extends therethrough the main body 121, thereby coupling the slurry swivel adapter 120 in fluid flowing relation relative to the passageway 112. When assembled, it will be readily recognized that a fluid passageway extends from the slurry swivel adapter to the longitudinally extending bore 107 which is formed in the earth engaging drill 100.

As seen in the exploded view of FIG. 7, the method of the present invention includes a step of providing an earth engaging drill bit and which is releasably mounted on the second end of the earth engaging drill 100. In use, the method of the present invention further includes a step of detaching the earth engaging drill bit from the earth engaging drill 100 before, or while simultaneously delivering an electrode as will be discussed below, into the bore hole 13 by employing the earth engaging drill 100. As seen in FIG. 7, the earth engaging drill 100 includes a threaded channel 130 which is formed in the second end 102 of same. The drill bit 131 includes a connector portion 132, which has a plurality of threads 133 formed therein, and which provides a means by which the connector portion 132 may threadably mate with the threaded channel 130. As will be appreciated from a study of FIG. 7, the earth engaging drill is operable to be rotated in a first direction which is generally indicated by the numeral 145 and which causes the earth engaging drill 100 to form a bore hole 13 in the surface of the earth 12. Still further, the earth engaging drill 100 is operable to be rotated in a second direction 146, and which will permit the earth engaging drill 100 to be removed from the bore hole 13 which has been formed in the earthen soil 11. In this regard, it will be recognized by a study of FIG. 7 that when the hydraulic motor 71 rotates the earth engaging drill 100 in the second direction 146, this rotational movement causes the drill bit 131 to threadably detach from the second end 102. The detachment of the drill bit 131 allows the delivery of the electrode 140 into the bore hole 13 while the earth engaging drill is simultaneously withdrawn from the bore hole 13.

The methodology of the present invention also includes a step of positioning an electrode 140 in the centrally disposed longitudinally extending bore 107 of the earth engaging drill 100. The electrode 140 has a diametral dimension which is less than the cross-sectional or inside diametral dimension of the longitudinally extending passageway or bore 107 which is formed in the earth engaging drill 100 thereby allowing the electrode 140 to be telescopingly received in same. The electrode 140 has a first end 141 and an opposite second end 142 as seen in FIG. 7. An internal threaded passageway 143 is formed in the first end 141, and is operable to threadably mate with a lifting eyelet which is generally indicated by the numeral 144. As should be understood, the lifting eyelet 144 permits an operator (not shown) to appropriately position the electrode in substantially coaxial alignment with the bore 107 such that it may be substantially coaxially received in same. As earlier discussed, the electrode 140 is operable to be coupled to an external source of electricity to the facilitate vitrification of the surrounding earthen soil 11.

Referring now to FIG. 2, the method of the present invention further includes the step of providing an electrically conductive slurry; coupling the electrically conductive slurry in fluid flowing relation relative to the earth engaging drill 100; and electrically coupling the electrode 140 to the surrounding earthen soil 11 by delivering the electrically conductive slurry to the bore hole 13 by way of the earth engaging drill 100. To achieve the following steps, a slurry delivery assembly 150 is provided. As seen in FIG. 2, the slurry delivery device 150 includes a holding tank 151 for holding the electrically conductive material which will be formed into a slurry. Such material is well known in the art and may include particulate carbon and other similar materials which are operable to transmit electrical current. The holding tank 151 is coupled in fluid flowing relation to a transfer pump 152. The transfer pump is operable to remove the particulate material which will be formed into the slurry and move it by means of a conduit 153 into a vortex tank 154. The vortex tank 154 upon receiving the material to form the slurry combines it with a source of water. A pump 155 is then provided and which is coupled in fluid flowing relation relative to the vortex tank. The pump is coupled in fluid flowing relation relative to a conduit 156. The conduit 156 is operable to deliver the electrically conductive slurry 157, so formed in the vortex tank 154, to the earth engaging drill 100 by way of the slurry swivel adapter 120 that was earlier described. The slurry 157 (FIG. 2) electrically couples the electrode 140 to the surrounding earthen soil 11.

Figure 4:
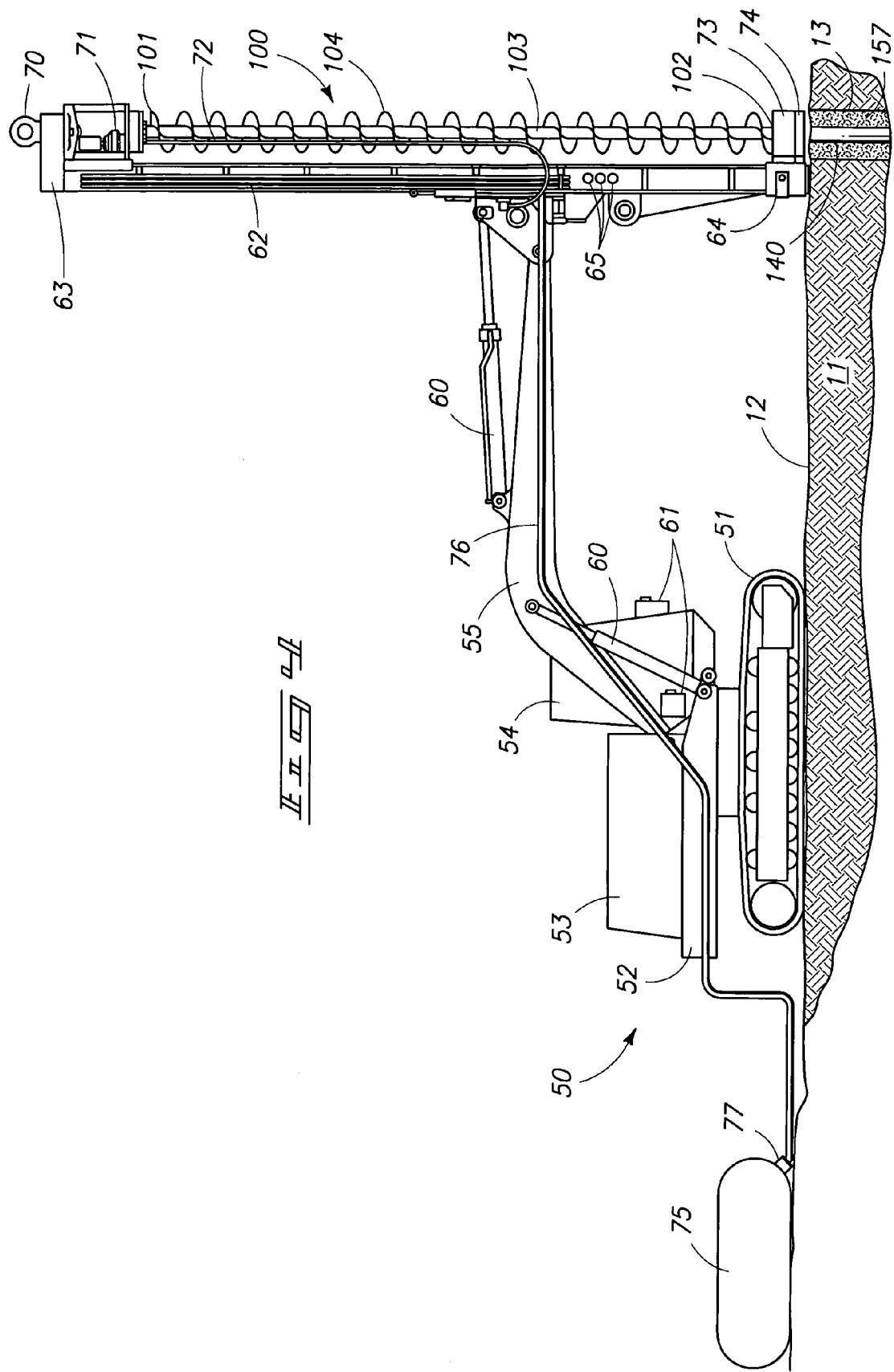
FIG. 4 is a greatly simplified depiction of an arrangement for practicing the method of the present invention.

Therefore as will be seen by reference to FIGS. 2, 4 and 7, the method of the present invention and which is useful for the placement of a subterranean electrode 140 includes providing an earth engaging drill 100; providing an electrode 140 which is releasably borne by the earth engaging drill 100; moving the earth engaging drill in a first direction 145 to form a subterranean bore hole 13, and wherein the electrode 140 moves in unison with the earth engaging drill 100 as it moves in the first direction; moving the earth engaging drill in a second direction 146 to remove the earth engaging drill 100 from the subterranean bore hole 13, and wherein the electrode remains substantially within the bore hole 13. As will be appreciated, the present earth engaging drill may form a bore hole without the electrode being present in same. Once the bore hole is formed, the electrode may be placed in the earth engaging drill, and then the drill is removed from the bore hole. In this arrangement, the electrode is again deposited in the bore hole as the earth engaging drill is withdrawn. The methodology of the present invention further includes a step of providing an electrically conductive slurry 157 and coupling the electrically conductive slurry in fluid flowing relation relative to the earth engaging drill 100; and delivering the electrically conductive slurry 157 into the bore hole 13 while simultaneously moving the earth engaging drill in the second direction 146. As earlier discussed, the methodology of the present invention further includes the step of removing any earthen soil or contaminated material from the earth engaging drill 100 as the earth engaging drill moves in the second direction, and is removed from the subterranean bore hole 13, by way of a spray ring 74, and which is mounted on the drilling gantry 62. As earlier discussed, prior to rotating the earth engaging drill in the first direction 145, the methodology of the present invention, includes a step of positioning the electrode 140 in the centrally disposed bore 107 of the earth engaging drill (FIG. 7). Still further, the methodology of the present invention further includes the step of detaching the earth engaging drill bit 131 from the second end 102 of the earth engaging drill 100, before or while simultaneously delivering the electrode 140 into the bore hole 13; and further removing the earth engaging drill 100 from the bore hole 13 by rotating the earth engaging drill in the second direction 146.

Figure 3:
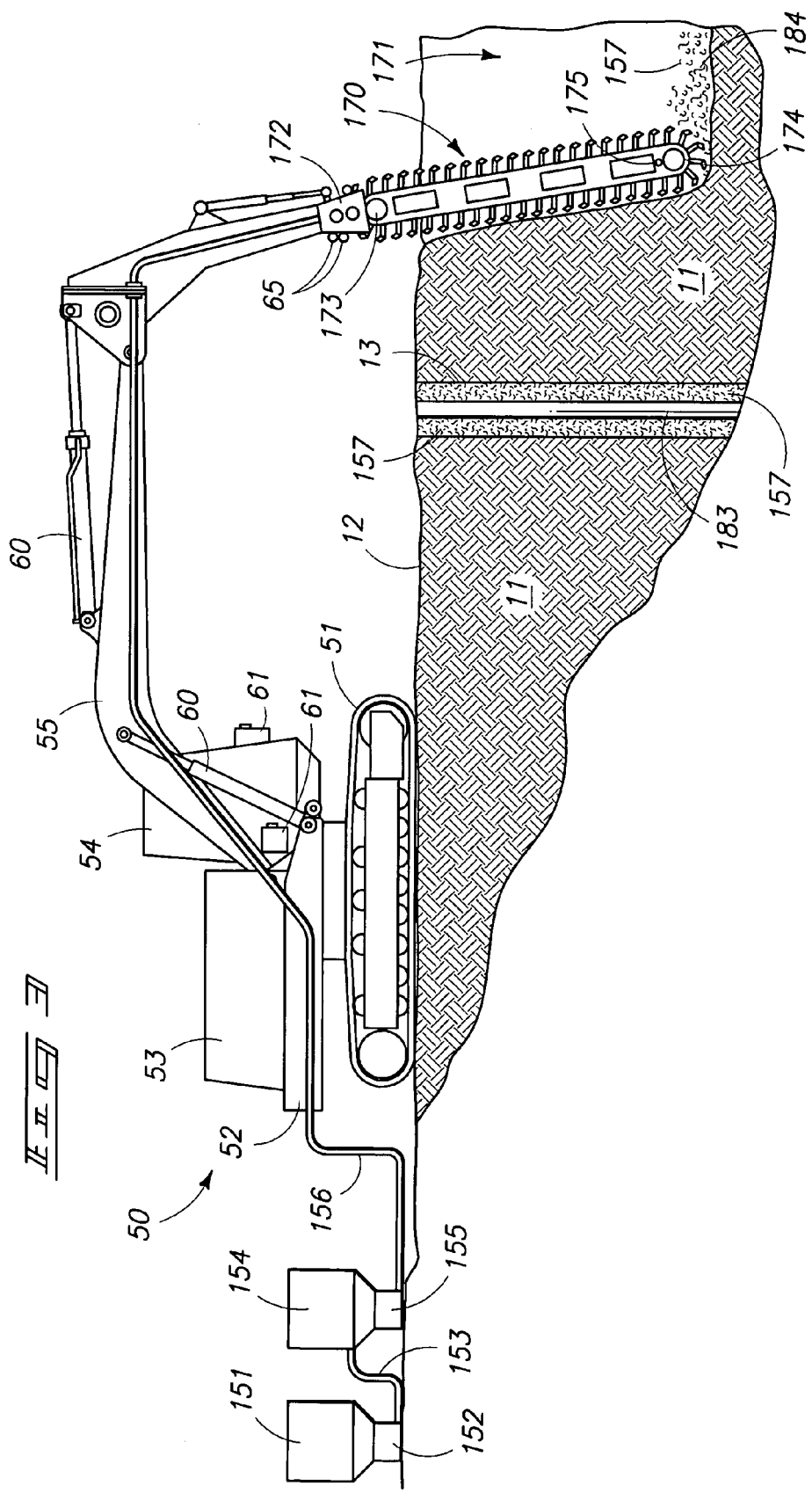
FIG. 3 is a second greatly simplified depiction of an arrangement for practicing the method of the present invention.
Figure 5:
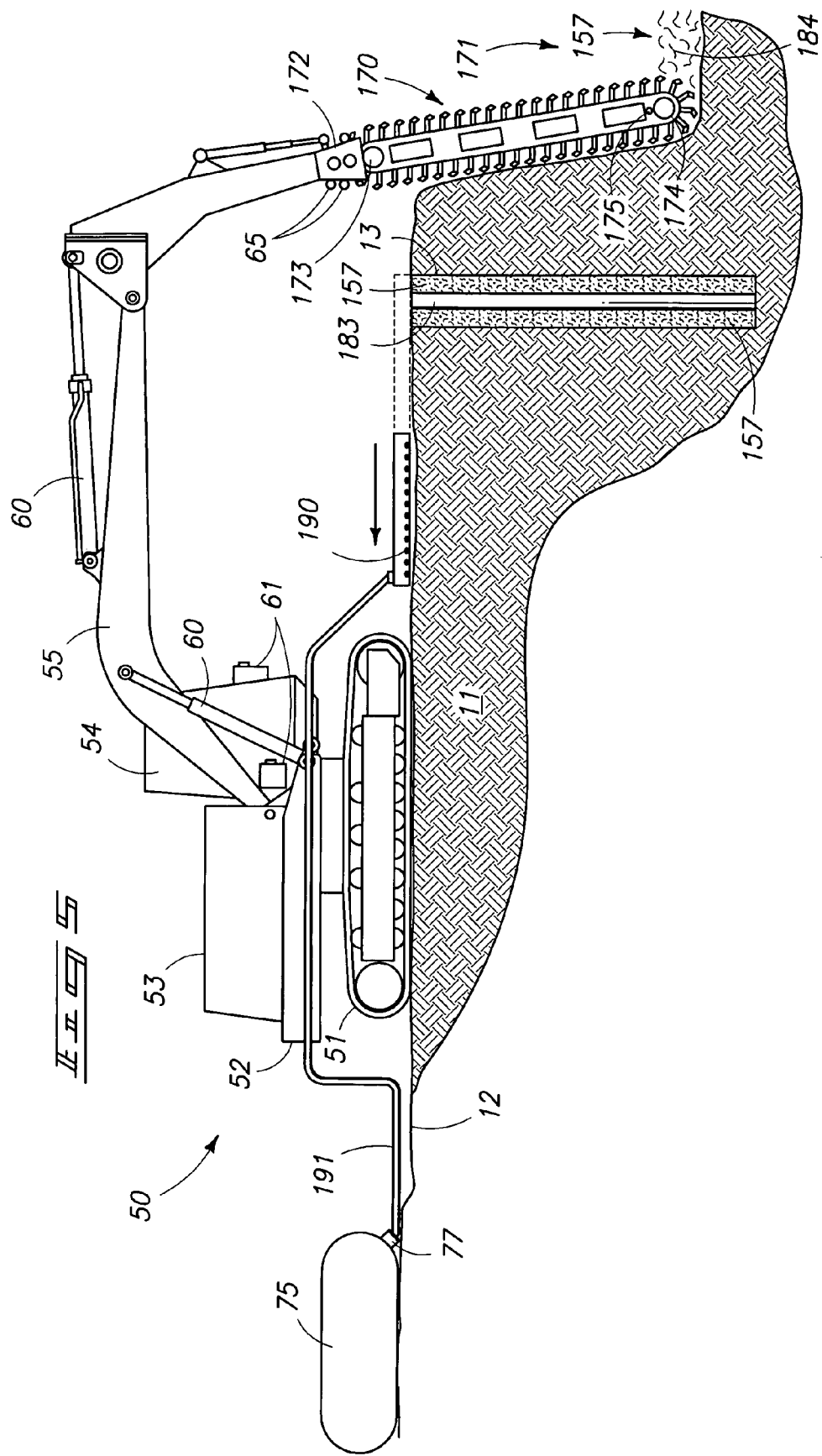
FIG. 5 is still yet another greatly simplified depiction of an arrangement for practicing the method of the present invention.
Figure 8:
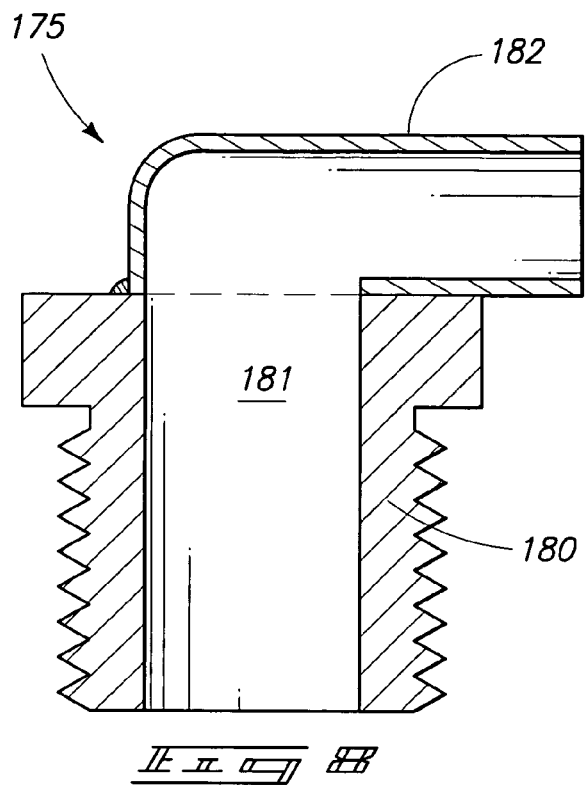
FIG. 8 is a vertical, sectional view taken through a fluid delivery device which is made integral with one of the assemblies and which is useful for practicing the present invention.

Referring now to FIGS. 3, 5 and 6, it will be seen that the method of the present invention for the placement of subterranean electrodes 140 includes the step of providing an overland vehicle 50; and providing a trenching bar 170 which is borne by the overland vehicle and which, when rendered operable, forms a trench 171 in the surface of the earth 11. The trenching bar is coupled to the overland vehicle by means of a swivel connector 172 which permits the trenching bar to be oriented in a substantially vertical or horizontal orientation. In the vertical orientation, the trenching bar may form a substantially lateral and vertically oriented trench as seen in FIG. 3, for example. When disposed in a substantially horizontal orientation, the trenching bar can be utilized to backfill a trench that has been so formed. The trenching bar 170 includes a first end 173 which is mounted on the overland vehicle 50, and further has an opposite second earth engaging end 174. As seen in FIGS. 3, 5 and 8, the trenching bar 170 includes a slurry port which is generally indicated by the numeral 175. The slurry port permits the trenching bar 170 to deliver the electrically conductive slurry 157 into the trench 171 which is being formed by the trenching bar 170. As seen in FIG. 8, the slurry port 175 has a threaded main body 180 which defines a passageway 181. As seen, the passageway is curved thereby providing a shielding outer surface 182 which prevents the occlusion of the passageway by earthen soil, debris and the like as the trenching bar forms the trench 171. As best seen by reference to FIG. 3, the methodology of the present invention includes forming a trench 171 between a first electrode 140 (not seen in this view), and a second electrode 183 by moving the overland vehicle 50 or trenching bar 170 between the first and second electrodes 140 and 183. The methodology of the present invention further includes the steps of coupling the electrically conductive slurry 157 in fluid flowing relation relative to the second end of the trenching bar 174. As noted above, the electrically conductive slurry 157 exits the trenching bar by way of the slurry port 175 and is delivered into the trench 171. The delivery of the electrically conductive slurry 157 to the second end of the trenching bar has the effect of forming a subterranean electrically conductive pathway 184 as the trenching bar forms the trench 171.

Referring now to FIG. 5, it will be seen that the method of the present invention further includes providing the overland vehicle 50 with a spray bar which is generally indicated by the numeral 190. The spray bar is operable to dispense high pressure liquid (typically water) provided by the tank 75 and associated pump 77 to the trenching bar 170 once its removed from the trench 171 in order to remove any earthen soil or other debris which adheres to same. In this regard, the spray bar is coupled in fluid flowing relation relative to the source of fluid 75 and the pump 77 by way of a conduit generally indicated by the numeral 191. As seen in FIG. 3 for example, the trenching bar 170 further includes the electro-optical targets generally indicated by the numeral 65. As seen in FIG. 6, electromagnetic radiation 66 emitted by the electrical optical assembly 61 can be directed towards the individual targets 65 and reflected back towards the overland vehicle thereby allowing the operator of the overland vehicle to appropriately position and maneuver the trenching bar in order to form an accurately aligned trench 171 between the pair of electrodes 140 and 183, respectively.

OPERATION

The operation of the described embodiment of the present invention is believed to be readily apparent and is briefly summarized at this point.

In its broadest aspect, the present methodology for the placement of subterranean electrodes 140 includes a step of providing an earth engaging drill 100; forming a bore hole 13 in the surface of the earth with the earth engaging drill; providing an electrode 140; and delivering the electrode into the bore hole 13 by employing the earth engaging drill. In this regard, the methodology of the present invention further includes the step of placing the earth engaging drill 100 into contact with the surface of the earth 12; and rotating the earth engaging drill in a first direction 145 to form the bore hole 13. As earlier discussed, the methodology includes the step of forming a centrally disposed bore 107 in the earth engaging drill 100, and wherein the centrally disposed bore 107 extends between the first and second ends 101 and 102 thereof and has a predetermined cross sectional dimension which will receive an electrode 140. As discussed earlier, the electrode has a cross sectional dimension which is less than the cross sectional dimension of the centrally disposed bore 107. This permits the positioning of the electrode 140 in the centrally disposed bore of the earth engaging drill 100.

In the method of the present invention an earth engaging drill bit 131 is provided and which is releasably mounted on the second end 102 of the earth engaging drill 100. The method further includes a step of detaching the earth engaging drill bit from the earth engaging drill, before or while simultaneously delivering the electrode 141 into the bore hole 13. As seen by the drawings, the methodology includes a step of removing the earth engaging drill 100 from the bore hole by rotating the earth engaging drill 100 in a second direction 146. In order to appropriately position the electrode 140, the methodology includes the step of providing an overland vehicle for carrying and positioning the earth engaging drill in a drilling position relative to the surface of the earth 12. In this regard, the methodology includes the step of providing an electro-optical alignment assembly 60 which is borne by the overland vehicle and which facilitates the positioning of the earth engaging drill assembly in a given orientation relative to the surface of the earth 12. Still further, the methodology includes providing an electrically conductive slurry 157, and coupling the electrically conductive slurry in fluid flowing relation relative to the earth engaging drill 100. The present methodology also includes a step of electrically coupling the electrode to the surrounding earth 11 by delivering the electrically conductive slurry 157 to the bore hole 13 by way of the earth engaging drill while simultaneously delivering the electrode 140 into the bore hole 13.

The methodology of the present invention further includes a step of removing the earth engaging drill 100 from the bore hole 13, and removing any earthen soil or contaminated material from the earth engaging drill 100 as the earth engaging drill 100 is removed from the bore hole 13. Referring still to the drawings, the method of the present invention further includes a step of positioning a second electrode 183 in a subterranean location which is located in spaced relation relative to the first electrode 140; providing an electrically conductive slurry 157; and forming a subterranean electrical pathway 184 between the first and second electrodes by delivering the electrically conductive slurry between the first and second electrodes 140 and 183. In order to accomplish the foregoing, the present methodology includes providing a trenching bar 170 which is borne by the overland vehicle 50 and which, when rendered operable, forms a trench 171 in the surface of the earth 12, and between the first and second electrodes 140 and 183, respectively. Still further, methodology includes coupling the electrically conductive slurry 157 in fluid flowing relation relative to the second end 174 of the trenching bar 170 (FIG. 3); and delivering the electrically conductive slurry 157 to the second end of the trenching bar to form the subterranean electrically conductive pathway as the trenching bar forms the trench 171. The methodology of the present invention further includes the steps of removing the trenching bar 170 from the trench 171; and removing any earthen soil or other contaminated material from the trenching bar as the trenching bar is removed from the trench. Such is achieved by providing a source of liquid under pressure 75; providing a spraying assembly in the form of a spray bar 190 which is borne by the overland vehicle 50; and coupling the source of liquid under pressure in fluid flowing relation relative to the spraying assembly (FIG. 5).

Therefore, it will be seen that the methodology of the present invention provides a convenient means whereby subterranean electrodes may be effectively placed and thereafter electrically coupled together, and which facilitates the convenient vitrification of earthen soil in order to encase hazardous waste materials and the like.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method for the placement of subterranean electrodes, comprising:
   providing an earth engaging drill which has a first end, and an opposite second end, and which further defines a centrally disposed bore which extends between the first and second ends;
   providing an earth engaging drill bit which is releasably mounted on the second end of the earth engaging drill;
   drilling a bore hole in the earth by bringing the earth engaging drill bit into contact with the surface of the earth and rotating the earth engaging drill and drill bit in a first direction to form the bore hole in the earth;
   positioning a first electrode in the centrally disposed bore of the earth engaging drill;
   detaching the earth engaging drill bit from the second end of the earth engaging drill, before, or while simultaneously delivering the first electrode into the bore hole;
   removing the earth engaging drill from the bore hole by rotating the earth engaging drill in a second direction;
   positioning a second electrode in a subterranean location which is located in spaced relation relative to the first electrode;
   providing an electrically conductive slurry;
   providing an overland vehicle;
   providing a trenching bar borne by the overland vehicle and which, when rendered operable, forms a trench in the surface of the earth, and wherein the trenching bar has a first end mounted on the overland vehicle and an opposite second earth engaging end;

forming a trench between the first and second electrodes by moving the overland vehicle between the first and second electrodes;

coupling the electrically conductive slurry in fluid flowing relation relative to the second end of the trenching bar; and delivering the electrically conductive slurry to the second end of the trenching bar to form a subterranean electrically conductive pathway between the first and second electrodes as the trenching bar forms the trench.

2. A method as claimed in claim 1, and further comprising:

providing an overland vehicle for carrying and positioning the earth engaging drill in a drilling position relative to the surface of the earth.

3. A method as claimed in claim 2, and further comprising:

providing an electro-optical alignment assembly which is borne by the overland vehicle and which facilitates the positioning of the earth engaging drill assembly in a given orientation relative to the surface of the earth.

4. A method as claimed in claim 1, and further comprising:

providing an electrically conductive slurry;

coupling the electrically conductive slurry in fluid flowing relation relative to the earth engaging drill; and electrically coupling the first electrode to the surrounding earth by delivering the electrically conductive slurry to the bore hole by way of the earth engaging drill.

5. A method as claimed in claim 1, and after the step of detaching the earth engaging drill bit, and then delivering the first electrode into the bore hole, the method further comprises:

removing the earth engaging drill from the bore hole; and removing any earthen soil or other contamination from earth engaging drill as the earth engaging drill is removed from the bore hole.

6. A method as claimed in claim 5, and wherein the step of removing any earthen soil from the earth engaging drill further comprises:

providing a source of a liquid under pressure; and spraying the source of the liquid under pressure onto the earth engaging drill as the earth engaging drill is removably withdrawn from the bore hole to release any earthen soil attached to the earth engaging drill.

7. A method as claimed in claim 1, and after the step of forming the trench, the method further comprises:

removing the trenching bar from the trench; and removing any earthen soil or other contaminated material from the trenching bar as the trenching bar is removed from the trench.

8. A method as claimed in claim 7, and wherein the step of removing any earthen soil or other contaminated material further comprises:

providing a source of liquid under pressure;

providing a spraying assembly which is borne by the overland vehicle;

coupling the source of liquid under pressure in fluid flowing relation relative to the spraying assembly;

spraying the liquid under pressure by way of the spraying assembly onto the trenching bar which has been removably withdrawn from the trench to substantially remove any earthen soil or other contaminated material from the trenching bar.

9. A method for the placement of subterranean electrodes, comprising:

providing an earth engaging drill;

providing a first electrode;

drilling a bore hole in the earth with the earth engaging drill, and wherein the earth engaging drill forms the bore hole while simultaneously carrying the first electrode into the bore hole;

removing the earth engaging drill from the bore hole while leaving the first electrode in the bore hole;

positioning a second electrode in a subterranean location which is spaced form the first electrode;

providing a trenching bar having a distal end;

coupling a source of an electrically conductive slurry in fluid flowing relation relative to the distal end of the trenching bar; and forming a trench therebetween the first and second electrodes while simultaneously forming an electrical pathway between the first and second electrodes by delivering the electrically conductive slurry into the trench as it is being formed.

10. A method for the placement of subterranean electrodes, comprising:

forming a bore hole in the earth while simultaneously delivering and electrically coupling a first electrode with the surrounding earth;

positioning a second subterranean electrode in spaced relation relative to the electrode;

providing a source of electrically conductive slurry;

providing a trenching bar having a distal end and coupling the electrically conductive slurry in fluid flowing relation relative to the distal end thereof; and forming a trench therebetween the first and second electrodes while simultaneously delivering the electrically conductive slurry into the trench to form an electrically conductive pathway therebetween the first and second electrodes.

* * * * *